United States Patent
Wang et al.

(10) Patent No.: US 10,197,880 B2
(45) Date of Patent: Feb. 5, 2019

(54) LIQUID CRYSTAL LENS, DISPLAY DEVICE AND DRIVING METHOD THEREOF

(71) Applicant: BOE TECHNOLOGY GROUP CO., LTD., Beijing (CN)

(72) Inventors: Qian Wang, Beijing (CN); Xiaochuan Chen, Beijing (CN); Wenqing Zhao, Beijing (CN); Yafeng Yang, Beijing (CN); Jian Gao, Beijing (CN); Wei Wang, Beijing (CN); Jifeng Tan, Beijing (CN); Xiaochen Niu, Beijing (CN); Haiyan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/569,784

(22) PCT Filed: Apr. 17, 2017

(86) PCT No.: PCT/CN2017/080806
§ 371 (c)(1),
(2) Date: Oct. 27, 2017

(87) PCT Pub. No.: WO2017/215340
PCT Pub. Date: Dec. 21, 2017

(65) Prior Publication Data
US 2018/0231810 A1 Aug. 16, 2018

(30) Foreign Application Priority Data
Jun. 17, 2016 (CN) .......................... 2016 1 0440472

(51) Int. Cl.
*G02F 1/133* (2006.01)
*G02F 1/137* (2006.01)
(Continued)

(52) U.S. Cl.
CPC .......... *G02F 1/137* (2013.01); *C09K 19/0275* (2013.01); *G02F 1/13306* (2013.01);
(Continued)

(58) Field of Classification Search
None
See application file for complete search history.

(56) References Cited

U.S. PATENT DOCUMENTS 8,570,451 B2    10/2013    Chang et al.
9,013,647 B2    4/2015     Takahashi
(Continued)

FOREIGN PATENT DOCUMENTS

CN    102540558        7/2012
CN    102566064 A      7/2012
(Continued)

OTHER PUBLICATIONS

Office action from Chinese Application No. 201610440472.8 dated Apr. 4, 2018.
(Continued)

*Primary Examiner* — Richard H Kim
(74) *Attorney, Agent, or Firm* — Calfee, Halter & Griswold LLP

(57) ABSTRACT

A liquid crystal lens, a display device and a driving method of the display device are disclosed. The liquid crystal lens includes a first substrate, a second substrate, and a driving electrode layer and blue phase liquid crystals disposed between the first substrate and the second substrate; the driving electrode layer includes driving electrodes, each driving electrode includes at least two electrode pairs, the electrode pair includes two sub-electrodes which are disposed opposite to each other and can be applied with a voltage separately, and all the sub-electrodes in the same driving electrode are insulated from each other; the sub-
(Continued)

electrodes of different electrode pairs in the same driving electrode are unparallel to each other; and the blue phase liquid crystals at different positions have deformations of different degrees in electrical fields with different intensities generated by the different sub-electrodes.

15 Claims, 4 Drawing Sheets

(51) Int. Cl.
    *G02F 1/29*     (2006.01)
    *C09K 19/02*     (2006.01)
    *G02F 1/13363*     (2006.01)

(52) U.S. Cl.
    CPC ............ *G02F 1/13363* (2013.01); *G02F 1/29* (2013.01); *G02F 2001/13793* (2013.01)

(56) References Cited

U.S. PATENT DOCUMENTS

| | | |
|---|---|---|
| 9,256,075 B2 | 2/2016 | Jeong et al. |
| 2012/0162550 A1 | 6/2012 | Jeong et al. |
| 2013/0201415 A1 | 8/2013 | Chang et al. |
| 2014/0152926 A1 | 6/2014 | Takahashi |
| 2016/0124237 A1 | 5/2016 | Jeong et al. |

FOREIGN PATENT DOCUMENTS

| | | |
|---|---|---|
| CN | 202533687 U | 11/2012 |
| CN | 103760711 | 4/2014 |
| CN | 103852949 A | 6/2014 |
| CN | 105589277 | 5/2016 |
| CN | 105589277 A | 5/2016 |
| CN | 106019761 A | 10/2016 |
| CN | 205670228 | 11/2016 |
| CN | 205670228 U | 11/2016 |
| EP | 2472885 A2 | 7/2012 |
| EP | 2728404 | 5/2014 |
| WO | 2013/181401 | 12/2013 |

OTHER PUBLICATIONS

Search Report for International Patent Application No. PCT/CN2017/080806 dated Jul. 13, 2017.

LIQUID CRYSTAL LENS, DISPLAY DEVICE AND DRIVING METHOD THEREOF

CROSS-REFERENCE TO RELATED APPLICATIONS

The present application is based upon International Application No. PCT/CN2017/080806, filed on Apr. 17, 2017, which is based upon and claims priority to Chinese Patent Application No, 201610440472.8, entitled "liquid crystal lens, display device and driving method thereof", filed on Jun. 17, 2016, the entire contents of which are incorporated herein by reference.

TECHNICAL FIELD

The present disclosure relates to the field of display technology, and more particularly, to a liquid crystal lens, a display device and a driving method thereof.

BACKGROUND

In a conventional curved-display technology, a display panel is fabricated to have a physically curved or arched shape to form a curved-display panel. It is required that different positions of the curved-display panel directly face human eyes, and rays directly emitted from the different positions of the curved-display panel gather right before the human eyes, so as to obtain an optimal viewing experience. However, such a curved design may only improve the user viewing experience at a central viewing position, similar effects may not be obtained at other viewing positions, and the central viewing position is generally not adjustable as needed. In addition, a space occupation of the display panel having a curved or arched shape will be relatively large, which limits the practical use of the display panel, and at the same time, cost and process difficulty of manufacturing the display panel is relatively high.

SUMMARY

Embodiments of the present disclosure relate to a liquid crystal lens, a display device and a driving method thereof.

An embodiment of the present disclosure provides a liquid crystal lens including a first substrate and a second substrate, and further including a driving electrode layer and blue phase liquid crystals disposed between the first substrate and the second substrate; the driving electrode layer includes at least one driving electrode, each of the driving electrodes includes at least two electrode pairs, the electrode pair includes two sub-electrodes which are disposed opposite to each other and can be applied with a voltage separately, and any two of all the sub-electrodes in the same driving electrode are insulated from each other; the sub-electrodes are extended vertically in a direction perpendicular to the second substrate, and the sub-electrodes of different electrode pairs in the same driving electrode are unparallel to each other; and the blue phase liquid crystals at different positions have deformations of different degrees in electrical fields with different intensities generated by different ones of the electrode pairs, so that an imaging distance of the liquid crystal lens is varied smoothly according to a predetermined curve.

An embodiment of the present disclosure provides a display device including the liquid crystal lens provided according to the above embodiment.

An embodiment of the present disclosure further provides a driving method of a display device for driving the display device provided by the above embodiment, including: not applying a voltage to the driving electrodes of the driving electrode layer to make the display device to perform a flat-display; and applying different voltages to all the sub-electrodes of the electrode pairs in all the driving electrodes respectively, so that the blue phase liquid crystals at different positions have deformations of different degrees in electrical fields with different intensities, and the imaging distance of the liquid crystal lens is varied smoothly according to the predetermined curve, so as to make the display device to perform a curved-display.

DETAILED DESCRIPTION

Figure 1:
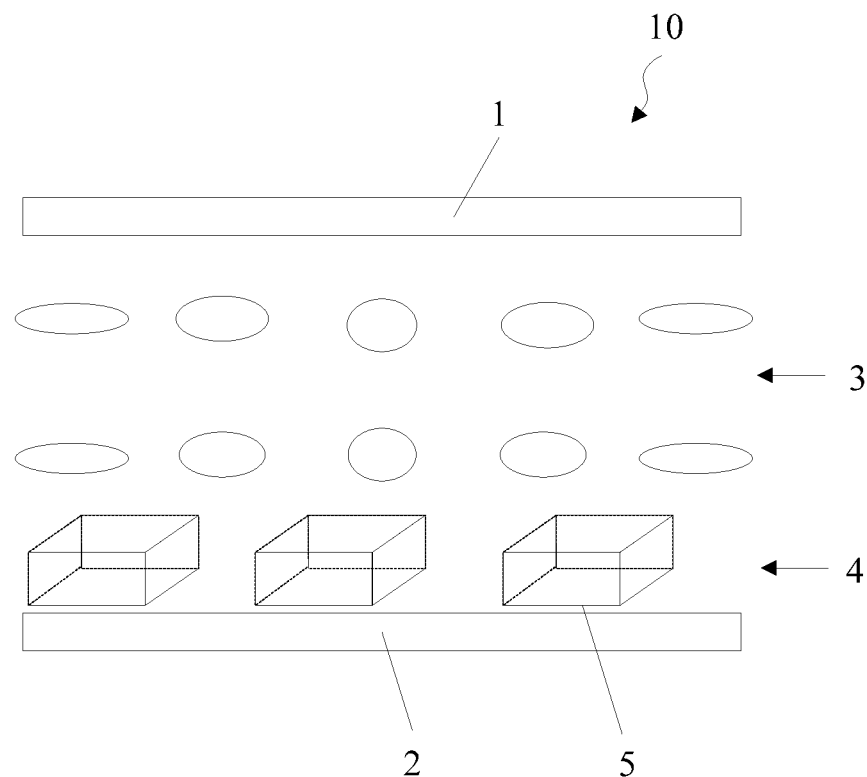
FIG. 1 is a schematic structural diagram of a liquid crystal lens according to an embodiment of the present disclosure.

The implementation of embodiments of the present disclosure will be described in detail below with reference to the accompanying drawings. It should be noted that, same or similar reference numerals refer to same or similar elements or elements having same or similar functions throughout the specification. The embodiments described below with reference to the accompanying drawings are illustrative and only for explaining the present disclosure, and are not to be construed as limiting the present disclosure.

Referring to FIG. 1, an embodiment of the present disclosure provides a liquid crystal lens 10 including a first substrate 1 and a second substrate 2, and further including blue phase liquid crystals 3 and a driving electrode layer 4 disposed between the first substrate 1 and the second substrate 2. Herein, the first substrate 1 may be an upper substrate, and the second substrate 2 may be a lower substrate. However, the present disclosure is not limited thereto, and the first substrate 1 may be the lower substrate, and the second substrate 2 may be the upper substrate.

The driving electrode layer 4 includes at least one driving electrode 5, each of the driving electrodes 5 includes at least two electrode pairs 6 (as shown FIGS. 3 and 4), the electrode pair 6 includes two sub-electrodes 7 which are disposed opposite to each other and may be applied with a voltage separately, and all the sub-electrodes 7 included in the same driving electrode 5 are insulated from each other.

The sub-electrodes 7 may be extended vertically in a direction perpendicular to the second substrate 2, and the sub-electrodes 7 of different electrode pairs 6 in the same driving electrode 5 are unparallel to each other. That is, the sub-electrodes 7 are disposed to be perpendicular to the second substrate 2 instead of being angled (i.e., oblique) with respect to the second substrate 2. For example, in an embodiment, the size of the sub-electrode 7 in the direction perpendicular to the second substrate 2 is greater than that of the sub-electrode 7 in the direction parallel to the second substrate 2. Alternatively, a plane-parallel capacitor having a horizontal electrical field may be formed between the sub-electrodes 7 disposed opposite to each other.

The blue phase liquid crystals 3 at different positions have deformations of different degrees in electrical fields with different intensities generated by the different electrode pairs 6, so that an imaging distance of the liquid crystal lens is varied smoothly according to a predetermined curve.

It should be noted that, since it may be required that the electric fields generated between the two sub-electrodes 7 of the different electrode pairs 6 are different, the electrode pairs 6 are preferably insulated from each other. Meanwhile, optical axis directions of the blue-phase liquid crystals 3 shown in FIG. 1 are merely intended to illustrate deformations of the blue-phase liquid crystals 3. Although all the electrode pairs 6 generate parallel electric fields, the directions of the electric fields generated by different electrode pairs 6 may be different, and the directions of the optical axis of the blue phase liquid crystals 3 are changed with the directions of the electric fields, which will not be repeated herein.

In the present embodiment, the two sub-electrodes 7 of the electrode pairs 6 may be applied with a voltage separately, so that the electric field intensity between each of the electrode pairs 6 may be adjusted as required. The sub-electrodes 7 of different electrode pairs 6 of one driving electrode 5 are unparallel to each other, and thus the electrode pairs 6 may be selected as required to drive the blue phase liquid crystals 3 to deform the same. Therefore, when the liquid crystal lens is used in the display device, an adjustable curved-display may be achieved without a physical curve, so that the cost and process difficulty of manufacturing the display device are decreased. At the same time, since the blue phase liquid crystals 3 will not be affected by the polarization state of incident light, the liquid crystal lens is applicable to the incident light in any polarization state. Further, the electrode pairs 6 may be selected to make the liquid crystal lens to correspond to the incident light in multiple directions.

In order to make the present disclosure to be understood more clearly, a detailed description will be made as follows.

The operating principle of the blue phase liquid crystals 3 is based on the Kerr effect. The blue phase liquid crystals 3 become optically uniaxial crystals when a voltage is applied to all the sub-electrodes 7 of the electrode pair 6, and the optical axis direction thereof is parallel to the direction of the electric field. The blue phase liquid crystals 5 incur the Kerr effect by the electric field to produce birefringence. The birefringence Δn is obtained from Formula 1:

$$\Delta n = \lambda K E^2 \quad (1)$$

Wherein λ is a wavelength, K is a Kerr coefficient, and E is an electric field intensity.

Therefore, the larger the electric field intensity is, the larger the birefringence Δn is.

Figure 2:
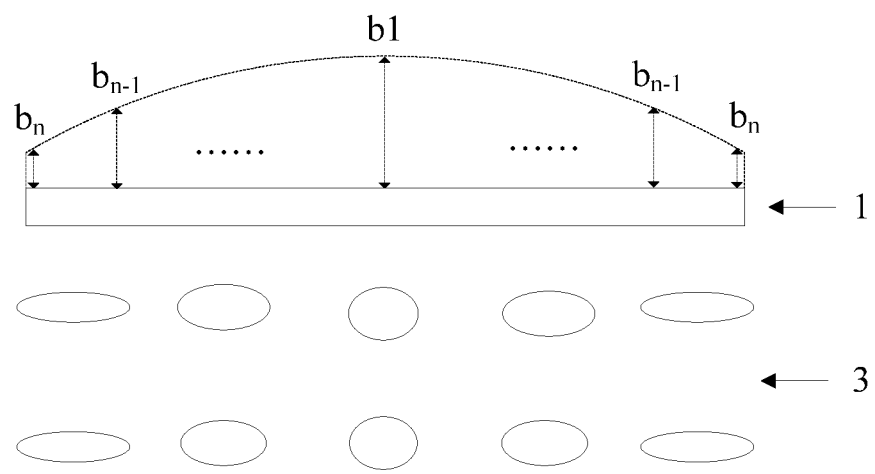
FIG. 2 is a schematic diagram of an electrical field intensity of a liquid crystal lens according to an embodiment of the present disclosure.

Referring to the schematic diagram of the electric field intensity when the liquid crystal lens 10 performs the curved-display as shown in FIG. 2, parallel electric fields are generated between all the sub-electrodes 7 of all the electrode pairs 6 when different voltages are applied to all the sub-electrodes 7 of all the electrode pairs 6 respectively. Therefore, the blue phase liquid crystals 5 have deformations of different degrees, so that the blue phase liquid crystals 5 at different positions of the liquid crystal lens 10 have different birefringence. Based on the fact that the blue phase liquid crystals 5 at different positions of the liquid crystal lens 10 have different birefringence, an imaging distance of the liquid crystal lens 10 is smoothed according to a predetermined curve. The varied electrical field intensities may be referred to as $b_1 \ldots b_{n-1}, b_n$ and so on shown in FIG. 3. These electrical field intensities are also varied according to a regular curve, for example, are decreased gradually from the center to the two sides. Of course, the electrical field intensities may be increased gradually from the center to the two sides by adjusting the voltages applied to the sub-electrodes 7 of different electrode pairs 6 respectively.

The output spectra of an S-polarized light, a P-polarized light and an unpolarized light after passing through the above Kerr box are consistent, that is, the polarization state of the incident light and the output spectra are independent. Therefore, the liquid crystal lens 10 of the present embodiment may be applied to the incident light in any polarization state.

When the electrode pairs 6 corresponding to different directions are selected, apparently, the liquid crystal lens 10 may correspond to the incident light in different directions.

The disposition of the driving electrode layer 4 may be implemented flexibly. For example, the driving electrode layer 4 is disposed on the surface of the first substrate toward the second substrate, and the blue phase liquid crystals 3 are disposed between the driving electrode layer 4 and the second substrate. For another example, the driving electrode layer 4 is disposed on the surface of the second substrate toward the first substrate, and the blue phase liquid crystals 3 are disposed between the driving electrode layer 4 and the first substrate. In the present embodiment, the driving electrode layer 4 may be disposed flexibly, which will not be repeated herein.

Figure 3:
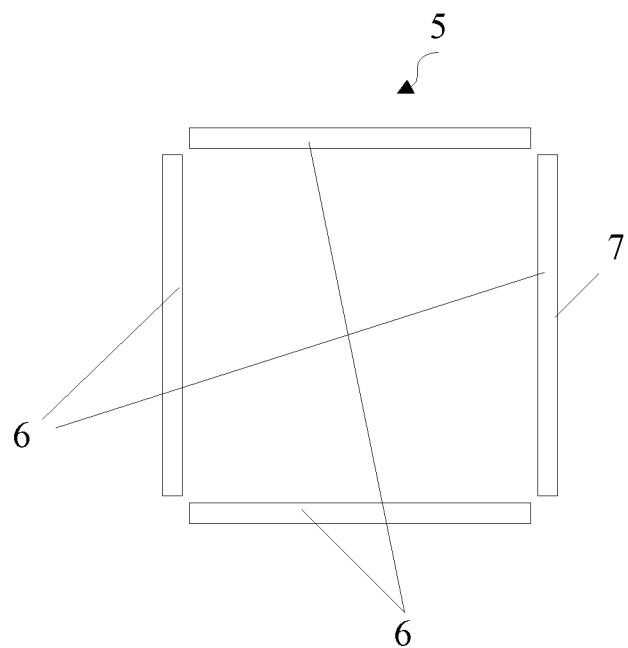
FIG. 3 is a schematic orthographic projection diagram of a first kind of driving electrode according to an embodiment of the present disclosure.
Figure 4:
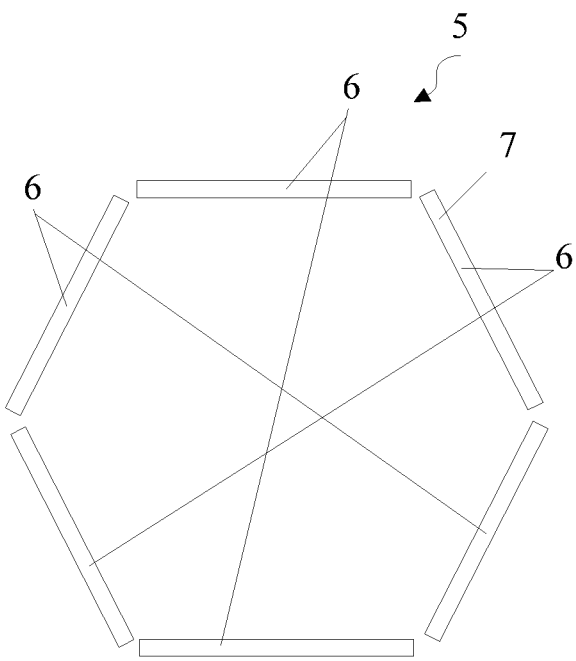
FIG. 4 is a schematic orthographic projection diagram of a second kind of driving electrode according to an embodiment of the present disclosure.

Orthographic projections of all the sub-electrodes 7 included in each of the driving electrodes 5 on the plane where the driving electrode layer 4 is located form an N polygon, and N is an even number greater than or equal to 4. In the present embodiment, the electrode pairs 6 correspond to the incident light in multiple directions. For example, as shown in FIG. 3, one driving electrode 5 includes two electrode pairs 6, and the orthographic projections of the sub-electrodes 7 of the two electrode pairs 6 form a quadrangle. For example, as show in FIG. 4, one deriving electrode 5 includes three electrode pairs 6, and the orthographic projections of the sub-electrodes 7 of the three electrode pairs 6 form a hexagon.

Figure 5:
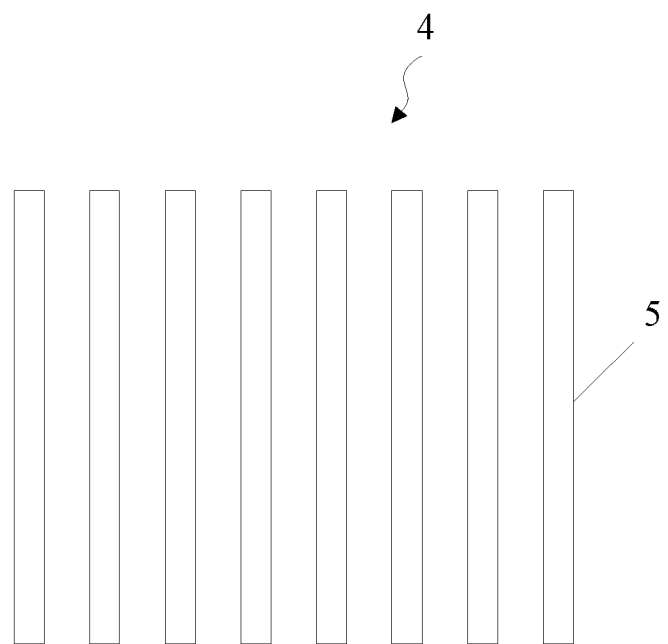
FIG. 5 is a schematic arrangement diagram of the first kind of driving electrode according to an embodiment of the present disclosure.
Figure 6:
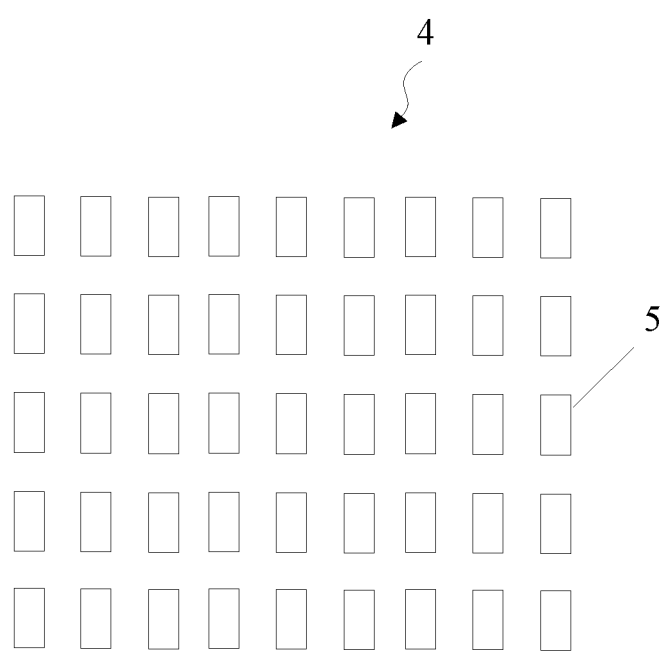
FIG. 6 is a schematic arrangement diagram of the second kind of driving electrode according to an embodiment of the present disclosure.

All the driving electrodes 5 may be arranged in like manner. For example, the driving electrode layer 4 includes two or more driving electrodes 5, the orthographic projections of the driving electrodes 5 on a plane where the driving electrode layer 4 is located are arranged in a column direction or a row direction, and all the driving electrodes 5 are arranged in parallel to each other in a line, as shown in FIG. 5. For another example, the driving electrode layer 4 includes two or more driving electrodes 5, and all the driving electrodes 5 are arranged in the column direction and the row direction, that is, are arranged in a matrix, as shown in FIG. 6.

In an embodiment, the orthographic projections of all the driving electrodes 5 on the plane where the driving electrode layer 4 is located have the same shape and the same size.

In an embodiment, all the sub-electrodes 7 have the same shape and the same size.

The embodiments of the present disclosure have the following advantages. The sub-electrodes 7 of the electrode pairs 6 may be applied with a voltage separately, so that the electric field intensity between each of the electrode pairs 6 may be adjusted as required. The sub-electrodes 7 of different electrode pairs 6 of one driving electrode 5 are unparallel to each other, and thus the electrode pairs 6 may be selected as required to drive the blue phase liquid crystals 3 so as to deform the same. Therefore, when the liquid crystal lens 10 is used in the display device, an adjustable curved-display may be achieved without a physical curve, so that the cost and process difficulty of manufacturing the display device are decreased. At the same time, since the blue phase liquid crystals 3 will not be affected by the polarization state of incident light, the liquid crystal lens 10 is applicable to the incident light in any polarization state. Further, the electrode pairs 6 may be selected to make the liquid crystal lens 10 to correspond to the incident light in multiple directions.

Figure 7:
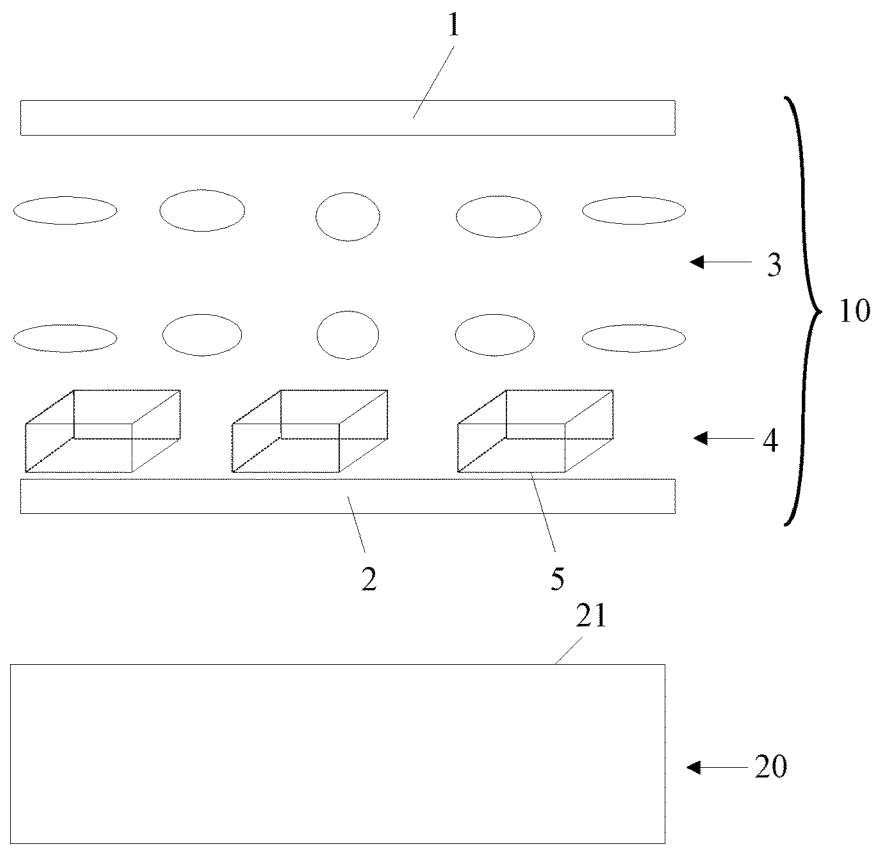
FIG. 7 is a schematic structural diagram of a display device according to an embodiment of the present disclosure.

Referring to FIG. 7, an embodiment of the present disclosure provides a display device, including the liquid crystal lens 10 provided by the above embodiments and further including a display panel 20, the liquid crystal lens 10 is disposed at a light-exiting side 21 of the display panel 20, and the second substrate 2 of the liquid crystal lens 10 is adjacent to the light-exiting side 21 of the display panel.

In an embodiment, the display panel 20 includes a liquid crystal display panel or an organic electroluminescent display panel.

The embodiments of the present disclosure have the following advantages. The sub-electrodes 7 of the electrode pairs 6 may be applied with a voltage separately, so that the electric field intensity between each of the electrode pairs 6 may be adjusted as required. The sub-electrodes 7 of different electrode pairs 6 of one driving electrode 5 are unparallel to each other, and thus the electrode pairs 6 may be selected as required to drive the blue phase liquid crystals 3 so as to deform the same. Therefore, when the liquid crystal lens 10 is used in the display device, an adjustable curved-display may be achieved without a physical curve, so that the cost and process difficulty of manufacturing the display device are decreased. At the same time, since the blue phase liquid crystals 3 will not be affected by a polarization state of incident light, the liquid crystal lens 10 is applicable to the incident light in any polarization state. Further, the electrode pairs 6 may be selected to make the liquid crystal lens 10 to correspond to the incident light in multiple directions.

Figure 8:
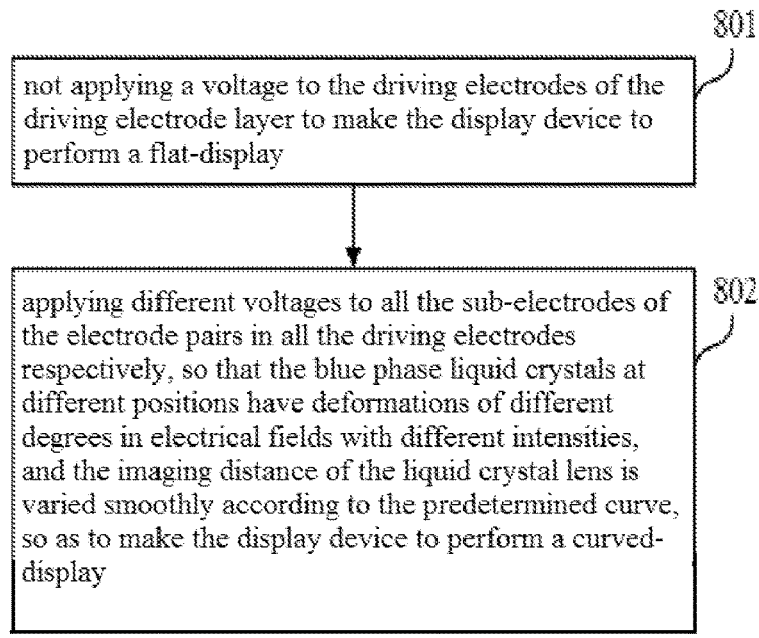
FIG. 8 is a flow chart of a driving method of a display device according to an embodiment of the present disclosure.

Referring to FIG. 8, an embodiment of the present disclosure provides a driving method of a display device for driving the display device provided by the above embodiments, including:

801, not applying a voltage to the driving electrodes of the driving electrode layer to make the display device to perform a flat-display; and

802, applying different voltages to individual sub-electrodes of the electrode pairs in respective driving electrodes respectively, so that the blue phase liquid crystals at different positions have deformations of different degrees in electrical fields with different intensities, and the imaging distance of the liquid crystal lens is varied smoothly according to the predetermined curve, so as to make the display device to perform a curved-display.

It should be noted that, the voltages applied to the two sub-electrodes of the electrode pair are generally different, and one of the two sub-electrodes of each electrode pair may be applied with a common voltage, so that an electrical field is generated between the two sub-electrodes.

In an embodiment, the voltages applied to all the sub-electrodes respectively are increased or decreased gradually from a central position of the liquid crystal lens to a position far away from the central position of the liquid crystal lens.

In an embodiment, the method further includes selecting the voltage applied to the sub-electrode according to the polarization direction of the incident light.

The embodiments of the present disclosure have the following advantages. The sub-electrodes of the electrode pairs may be applied with a voltage separately, so that the electric field intensity between each of the electrode pairs may be adjusted as required. The sub-electrodes of different electrode pairs of one driving electrode are unparallel to each other, and thus the electrode pairs may be selected as required to drive the blue phase liquid crystals so as to deform the same. Therefore, when the liquid crystal lens is used in the display device, an adjustable curved-display may be achieved without a physical curve, so that the cost and process difficulty of manufacturing the display device are decreased. At the same time, since the blue phase liquid crystals will not be affected by a polarization state of incident light, the liquid crystal lens is applicable to the incident light in any polarization state. Further, the electrode pairs may be selected to make the liquid crystal lens to correspond to the incident light in multiple directions.

It will be apparent to those skilled in the art that various changes and modifications may be made to the present disclosure without departing from the spirit and scope of the present disclosure. In this way, the present disclosure is intended to include such variations and modifications if the variations and modifications of the present disclosure are within the scope of the present disclosure and the equivalents thereof.

What is claimed is:

1. A liquid crystal lens comprising a first substrate, and a second substrate, a driving electrode layer, and blue phase liquid crystals disposed between the first substrate and the second substrate, wherein the driving electrode layer comprises at least one driving electrode, each of the driving electrodes comprises at least two electrode pairs, the electrode pair comprises two sub-electrodes disposed opposite to each other with a voltage separately applicable, and any two of all the sub-electrodes in a same driving electrode are insulated from each other;

the sub-electrodes are extended vertically in a direction perpendicular to the second substrate, and the sub-electrodes of different electrode pairs in the same driving electrode are unparallel to each other; and the blue phase liquid crystals at different positions have deformations of different degrees in electrical fields with different intensities generated by different ones of the electrode pairs, so that an imaging distance of the liquid crystal lens is varied smoothly according to a predetermined curve.

2. The liquid crystal lens according to claim 1, wherein the driving electrode layer is disposed on a surface of the first substrate toward the second substrate, and the blue phase liquid crystals are disposed between the driving electrode layer and the second substrate.

3. The liquid crystal lens according to claim 1, wherein the driving electrode layer is disposed on a surface of the second substrate toward the first substrate, and the blue phase liquid crystals are disposed between the driving electrode layer and the first substrate.

4. The liquid crystal lens according to claim 1, wherein orthographic projections of all the sub-electrodes in each of the driving electrodes on a plane where the driving electrode layer is located form an N polygon, wherein N is an even number and N is greater than or equal to 4.

5. The liquid crystal lens according to claim 1, wherein the driving electrode layer comprises two or more driving electrodes, orthographic projections of the driving electrodes on a plane where the driving electrode layer is located are arranged in one of a column direction and a row direction, and all the driving electrodes are arranged in parallel with each other in a line.

6. The liquid crystal lens according to claim 5, wherein the orthographic projections of all the driving electrodes on the plane where the driving electrode layer is located have the same shape and the same size.

7. The liquid crystal lens according to claim 1, wherein the driving electrode layer comprises two or more driving electrodes, and all the driving electrodes are arranged in a matrix.

8. The liquid crystal lens according to claim 1, wherein all the sub-electrodes have the same shape and the same size.

9. A display device, comprising the liquid crystal lens according to claim 1.

10. The display device according to claim 9 further comprising a display panel, the liquid crystal lens is disposed at a light-exiting side of the display panel, and the second substrate is adjacent to the light-exiting side of the display panel.

11. The display device according to claim 10, wherein the display panel comprises one of a liquid crystal display panel and an organic electroluminescent display panel.

12. A driving method of a display device for driving the display device according to claim 9, comprising:
    applying different voltages to all the sub-electrodes of the electrode pairs in all the driving electrodes respectively, so that the blue phase liquid crystals at different positions have deformations of different degrees in electrical fields with different intensities, and the imaging distance of the liquid crystal lens is varied smoothly according to the predetermined curve, so as to make the display device to perform a curved-display.

13. The driving method according to claim 12, wherein the voltages applied to all the sub-electrodes respectively are increased gradually from a central position of the liquid crystal lens to a position far away from the central position of the liquid crystal lens.

14. The driving method according to claim 12 further comprising selecting the voltage applied to the sub-electrode according to a polarization direction of an incident light.

15. The driving method according to claim 12, wherein the voltages applied to all the sub-electrodes respectively are decreased gradually from a central position of the liquid crystal lens to a position far away from the central position of the liquid crystal lens.

* * * * *